United States Patent

[11] 3,581,062

| [72] | Inventor | Keith Aston<br>England |
|---|---|---|
| [21] | Appl. No. | 815,511 |
| [22] | Filed | Feb. 18, 1969 |
| [45] | Patented | May 25, 1971 |
| [73] | Assignee | The Pavelle Corporation<br>New York, N.Y. |
| [32] | Priority | Feb. 19, 1968 |
| [33] | | Great Britain |
| [31] | | 8014/68 |

[54] ELECTRONIC THERMOSTAT
3 Claims, 2 Drawing Figs.

[52] U.S. Cl............................................... 219/501,
219/526, 219/505, 73/362
[51] Int. Cl.................................................. H05b 1/02
[50] Field of Search........................................ 219/501,
499, 523, 526, 505; 174/52.6; 73/362 (R)

[56] References Cited
UNITED STATES PATENTS

| 3,027,627 | 4/1962 | Sturdy.......................... | 174/52.6 |
| 3,098,950 | 7/1963 | Geshner....................... | 174/52.6 |
| 3,149,224 | 9/1964 | Horne et al................... | 219/501 |
| 3,449,641 | 6/1969 | Lee.............................. | 174/52.6 |

Primary Examiner—Bernard A. Gilheany
Assistant Examiner—F. E. Bell
Attorney—Darby and Darby ABSTRACT: A compact, unitary electronic thermostat is formed by encapsulating a temperature sensing element and a solid-state control circuit in a potting compound having good heat transfer characteristics. The unitary thermostat, which includes a solid-state electronic switch having conductive and nonconductive states which are varied in response to the output from the temperature sensing element to control a load power supply may be completely or partially immersed in a fluid environment.

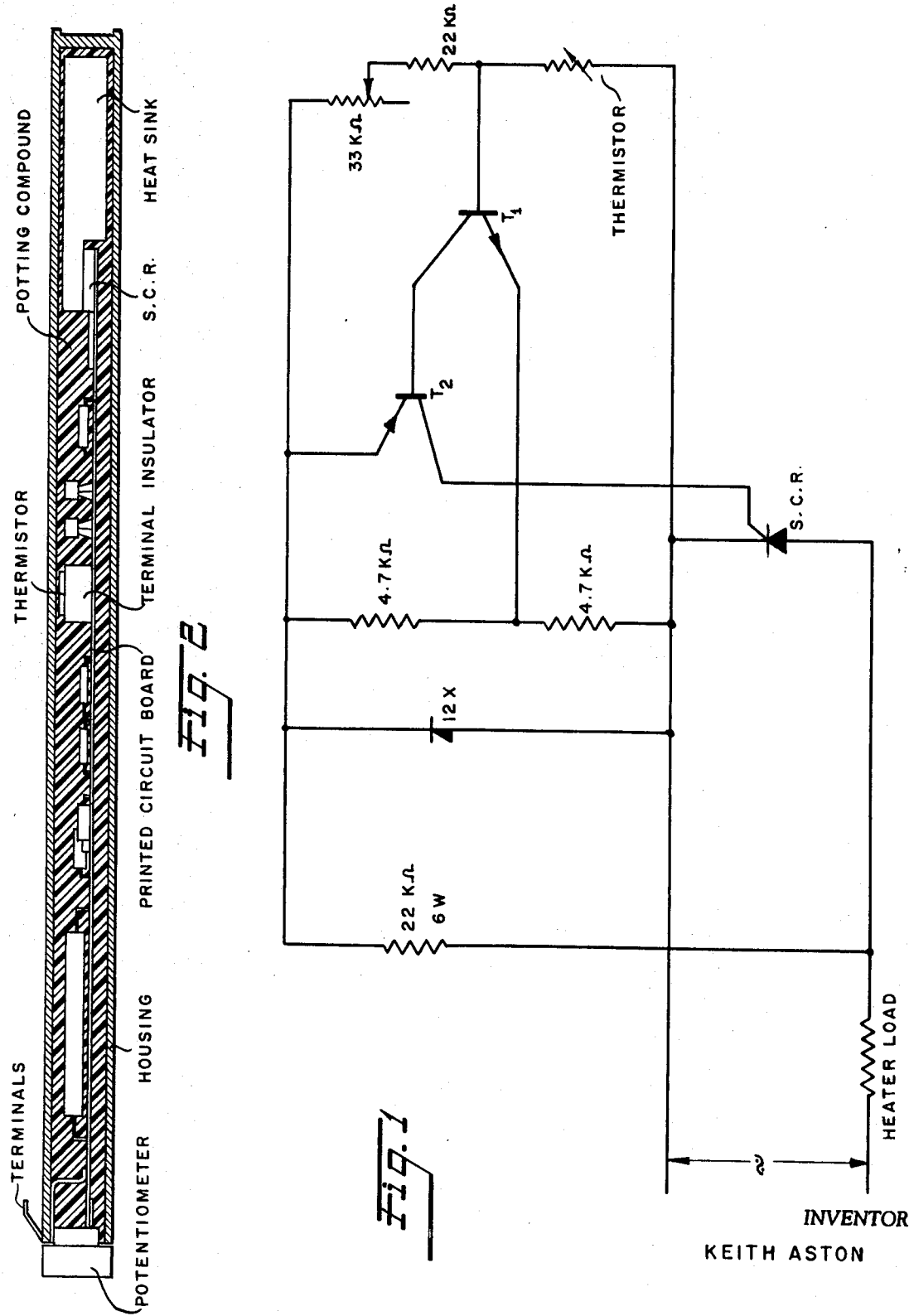

ELECTRONIC THERMOSTAT

This invention concerns improvements in or relating to electronic thermostats by which is meant a thermostat including a solid-state temperature-sensitive element or device and an electronic control circuit responsive to said temperature-sensitive element to control the supply of electrical power to a load, e.g. a heating element.

Hitherto it has been the practice to arrange the electronic control circuit of an electronic thermostat remote from the location of the temperature-sensitive element; for example the temperature-sensitive element might be immersed in a bath of liquid the temperature of which is to be controlled, while the control circuit might be housed in a control console and connected to the temperature-sensitive element by electrical conductors. This has been found to be disadvantageous primarily because of the effects of ambient temperature variation upon the operation of the electronic control circuit.

It is the object of the present invention to overcome or at least substantially reduce the above-mentioned disadvantage.

According to the present invention there is provided an electronic thermostat including a solid-state temperature-sensitive element and an electronic control circuit responsive to said element for controlling the supply of electrical power to a load, the temperature-sensitive element and the control circuit being set in a potting compound to form an integral unit.

It will be appreciated that if the electronic thermostat according to this invention is to be adjustable and consequently an adjustable component, e.g. a potentiometer, is to be provided in the electronic control circuit it is necessary to ensure that this adjustable component is accessible. Thus, while in a preset electronic thermostat according to this invention the entire control circuit will be set in potting compound, in an adjustable electronic thermostat the adjustable component of the control circuit will be arranged so as to be accessible, or alternatively terminals will be provided for connection to the control circuit by electric leads of an adjustable component at a location remote from that of the thermostat.

Preferably the electronic circuit of the electronic thermostat according to this invention is formed at least for the most part of miniature components such as transistors and/or semiconductor diodes and the temperature-sensitive element is a miniature solid-state device such as a miniature thermistor or thermoelectric element, in which case the size of the integral unit constituting the electronic thermostat may be reduced while other advantages inherent in the use of semiconductor components are realized. Thus one embodiment of the electronic thermostat according to the invention takes the form of a cylinder of diameter one-half inch and length 10 inches.

To set the electronic circuit and the temperature-sensitive element in potting compound they may be arranged in a mould, potting compound resin poured into the mould and allowed to set, and the electronic thermostat then removed from the mould. It is preferred however to provide a housing, of plastics or stainless steel for example, into which the electronic circuit and temperature-sensitive element are placed prior to the introduction into the housing of a potting compound.

The potting compound may be any one of a plurality which are suitable and are known in the art. Typically the potting compound is an epoxy resin plus setting agent, also a loading of silica flour may be added to give improved heat conduction. Good heat transfer is desirable in order that the temperature-sensitive element might sense the temperature of the environment of the thermostat quickly.

The electronic circuit of the electronic thermostat according to this invention preferably includes electronic switch means having conductive and nonconductive states controlled in response to the temperature-sensitive element. Preferably said switch means is a gate controlled rectifier device, such as a thyristor or a silicon controlled rectifier, the gate potential of which is controlled by the temperature-sensitive element. FIG. 1 of the accompanying drawings shows the circuit diagram of one electronic control circuit which has been found satisfactory: in this circuit the temperature-sensitive element is a thermistor which is connected in a bridge circuit coupled via amplifying transistors $T_1$ and $T_2$ to the gate electrode of a silicon controlled rectifier (S.C.R.). In use the S.C.R. is connected in series with a load across the AC mains supply, and its state of conduction is controlled by the thermistor to adjust the supply of power to the load. A Zener diode is provided which establishes a 12 volt D.C. voltage for supplying the transistors $T_1$ and $T_2$, and other biasing resistors are also provided. The control circuit is adjustable by virtue of the provision of a potentiometer connected in series with the thermistor across the 12 volt DC supply. It will be appreciated that the S.C.R. in series with the load operates as a half-wave rectifier, when the thermostat is powered by an AC mains supply, so that the power delivered to the load is half that which would otherwise be delivered. The power delivered to the load can be restored by doubling the load resistance, by providing full wave rectification, or by employing a bidirectional S.C.R. (also known as T.R.I.A.C.) which can conduct on both positive and negative half-cycles of the AC supply together with an appropriate triggering circuit.

In operation of the control circuit the S.C.R. will pass the full load current and it is necessary therefore to provide a heat-sink in intimate thermal connection therewith.

An embodiment of the invention intended for controlling the temperature of a bath of photographic processing fluid is illustrated in FIG. 2 of the accompanying drawings and consists of a tubular plastics housing (10 inches long and diameter one-half inch) closed at one end within which is contained the electronic control circuit and temperature-sensitive element just described in an epoxy resin potting compound. The control circuit is mounted upon a printed circuit broad to one end of which is attached a heat-sink in good thermal contact with the S.C.R. The thermistor is thermally insulated from other circuit components and is mounted so as to be close to the wall of the housing and thus in good thermal contact with the liquid whose temperature is to be controlled. In this embodiment the potentiometer adjustment is accessible at one end of the housing; it will be appreciated that the potentiometer might not be integral with the rest of the thermostat but could be separate, with terminals being provided on the housing for connection to a potentiometer. Furthermore it will be appreciated that although in this described embodiment the load is not included within the housing of the thermostat but is connectable with the electronic control circuit via terminals provided on the housing, in some applications, and in particular where the load is a heating element, it may be preferable to include the heating element within the thermostat housing, suitable precaution being taken to ensure that the control circuit and temperature-sensitive element are suitably thermally insulated from the heating element.

In use the illustrated embodiment is partly immersed in processing liquid with the upper end of the housing and the potentiometer adjustment and the terminals for connection with the load projecting above the liquid surface. In the case of a thermostat with a separate potentiometer adjustment the thermostat may be adapted for use totally immersed, with sheathed cables sealed into and extending from the thermostat housing for connection with an external potentiometer adjustment and with a power supply.

There has thus been described an electronic thermostat which takes a particularly convenient form, and is advantageous in that in use the electronic control circuit is maintained substantially at the temperature of the medium the temperature of which the thermostat is controlling and is not subject to considerable changes in ambient temperature. The encapsulation of the circuit and other components of the thermostat in a potting compound result in a particularly robust unit which can operate under severe vibration. The thermostat according to the invention described in detail herein is particularly convenient to manufacture and requires no maintenance, yet can be designed to achieve temperature control to within ±0.1° C., and depending upon the power rating of the S.C.R. to handle heavy load currents.

I claim:

1. An electronic thermostat for controlling power to a heater which controls the temperature of a liquid within an enclosed tank, comprising a housing adapted to be at least partially submerged in said liquid, variable impedance temperature sensing means adapted to provide an electrical output signal dependent upon the temperature of said liquid, a control circuit for controlling the current applied to said heater to thereby control the temperature of said liquid, said control circuit including a solid-state semiconductor device connected in circuit with said temperature sensing means, the flow of current through said semiconductor device being dependent upon the impedance of said temperature sensing means, said temperature sensing means and said control circuit being positioned within said housing said temperature sensing means being proximate a wall of said housing for good thermal contact with said liquid, a potting compound enveloping said temperature sensing means and said control circuit within said housing, and means thermally insulating said semiconductor device from said temperature sensing means.

2. An electronic thermostat according to claim 1, wherein said housing is made of a thermally conductive material and further including a heat-sink for conducting heat away from said semiconductor device, said heat-sink being mounted in a thermally conductive relationship with said housing.

3. An electronic thermostat according to claim 1, wherein said potting compound includes a thermally conductive material to increase its thermal conductivity.